United States Patent
Rietdijk

(10) Patent No.: US 10,633,906 B2
(45) Date of Patent: Apr. 28, 2020

(54) DEVICE FOR MANUALLY AND/OR ELECTROMOTIVELY ADJUSTING OR SECURING A FIRST VEHICLE PART AND A SECOND VEHICLE PART RELATIVE TO EACH OTHER

(71) Applicant: BROSE FAHRZEUGTEILE GMBH & CO. K.G., BAMBERG, Bamberg (DE)

(72) Inventor: Dalibor Rietdijk, Wetzlar (DE)

(73) Assignee: Brose Fahrzeugteile GmbH & Co. K.G., Bamberg (DE)

( * ) Notice: Subject to any disclaimer, the term of this patent is extended or adjusted under 35 U.S.C. 154(b) by 72 days.

(21) Appl. No.: 15/746,346

(22) PCT Filed: Aug. 15, 2016

(86) PCT No.: PCT/EP2016/069338
§ 371 (c)(1),
(2) Date: Feb. 27, 2018

(87) PCT Pub. No.: WO2017/029262
PCT Pub. Date: Feb. 23, 2017

(65) Prior Publication Data
US 2018/0209194 A1 Jul. 26, 2018

(30) Foreign Application Priority Data

Aug. 17, 2015 (DE) .................. 10 2015 215 630

(51) Int. Cl.
*E05F 3/22* (2006.01)
*B60J 5/04* (2006.01)
(Continued)

(52) U.S. Cl.
CPC ............. *E05F 3/222* (2013.01); *B60J 5/0468* (2013.01); *E05F 15/627* (2015.01); *F16H 1/46* (2013.01);
(Continued)

(58) Field of Classification Search
CPC ......... E05Y 2201/654; E05Y 2201/624; E05Y 2201/434; E05Y 2201/72; E05Y 2201/664;
(Continued)

(56) References Cited

U.S. PATENT DOCUMENTS

| 3,499,344 A | 3/1970 | Pickles |
| 3,921,264 A | 11/1975 | Madonian et al. |

(Continued)

FOREIGN PATENT DOCUMENTS

| CN | 1619086 A | 5/2005 |
| CN | 201106350 Y | 8/2008 |

(Continued)

OTHER PUBLICATIONS

Chinese Office action dated Apr. 1, 2019 issued in corresponding Chinese Application No. 201680048250.X, 9 pages, with English Translation, 2 pages.

(Continued)

*Primary Examiner* — Joseph D. Pape
*Assistant Examiner* — Dana D Ivey
(74) *Attorney, Agent, or Firm* — Lewis Roca Rothgerber Christie LLP

(57) ABSTRACT

A device for manually and/or electromotively adjusting or securing a first vehicle part and a second vehicle part relative to each other is provided. The device comprising an adjustment part which has a joint for pivotable arrangement on the first vehicle part, wherein the adjustment part is to be arranged on the first vehicle part in such a manner that, when (Continued)

the vehicle parts are adjusted relative to each other, the adjustment part moves relative to the second vehicle part, a traction cable which is fastened at a first end and at a second end to the adjustment part, and a cable drum which is to be arranged on the second adjustment part, is rotatable about a longitudinal axis and on which the traction cable is arranged.

19 Claims, 13 Drawing Sheets

(51) Int. Cl.
    E05F 15/627    (2015.01)
    F16H 19/06     (2006.01)
    F16H 1/46      (2006.01)
    E05F 3/16      (2006.01)
(52) U.S. Cl.
    CPC ............ *F16H 19/0631* (2013.01); *E05F 3/16* (2013.01); *E05Y 2201/434* (2013.01); *E05Y 2201/624* (2013.01); *E05Y 2201/654* (2013.01); *E05Y 2201/664* (2013.01); *E05Y 2201/72* (2013.01); *E05Y 2600/41* (2013.01); *E05Y 2900/531* (2013.01)
(58) Field of Classification Search
    CPC ........ E05Y 2600/41; E05F 3/16; E05F 3/222; E05F 15/627; F16H 19/0631; F16H 1/46; B60J 5/0468
    USPC ...................................................... 296/146.11
    See application file for complete search history.

(56) References Cited

U.S. PATENT DOCUMENTS

| | | | |
|---|---|---|---|
| 4,121,382 A | 10/1978 | Dietrich et al. | |
| 4,468,063 A | 8/1984 | Yukimoto et al. | |
| 4,529,920 A | 7/1985 | Yoshida et al. | |
| 4,644,693 A | 2/1987 | Wang | |
| 5,139,468 A | 8/1992 | Churchill et al. | |
| 5,319,881 A | 6/1994 | Kuhlman | |
| 5,396,158 A | 3/1995 | Long et al. | |
| 5,434,487 A | 7/1995 | Long et al. | |
| 5,588,258 A | 12/1996 | Wright et al. | |
| 5,823,905 A | 10/1998 | Torii et al. | |
| 6,125,586 A | 10/2000 | Buscher | |
| 6,179,742 B1 | 1/2001 | Haag et al. | |
| 6,318,025 B1 | 11/2001 | Sedlak | |
| 6,382,706 B2 | 5/2002 | Yuge et al. | |
| 6,460,295 B1 | 10/2002 | Johnson et al. | |
| 6,513,859 B2 | 2/2003 | Yuge | |
| 6,534,939 B2 | 3/2003 | Kato et al. | |
| 6,553,719 B1 | 4/2003 | Stone et al. | |
| 6,676,190 B2 | 1/2004 | Daniels et al. | |
| 6,776,443 B2 | 8/2004 | Shimura et al. | |
| 6,802,154 B1 | 10/2004 | Holt et al. | |
| 6,834,463 B2 | 12/2004 | Fukumoto et al. | |
| 6,871,449 B2 | 3/2005 | Ihashi | |
| 6,929,310 B2 | 8/2005 | Okada | |
| 7,014,248 B2 | 3/2006 | Yokota et al. | |
| 7,021,004 B2 | 4/2006 | Ritter | |
| 7,026,777 B2 | 4/2006 | Matsui et al. | |
| 7,069,695 B2 | 7/2006 | Hattori et al. | |
| 7,071,644 B2 | 7/2006 | Kawanobe | |
| 7,117,638 B2 | 10/2006 | Ihashi | |
| 7,156,447 B2 | 1/2007 | Watanabe | |
| 7,357,751 B2 | 4/2008 | Kleinmann et al. | |
| 7,370,905 B2 * | 5/2008 | Watanabe .............. | E05F 15/63 296/146.1 |
| 7,517,003 B2 | 4/2009 | Okada et al. | |
| 7,584,572 B2 | 9/2009 | Yokomori et al. | |
| 7,637,057 B2 | 12/2009 | Matsui et al. | |
| 7,770,961 B2 | 8/2010 | Oxley | |
| 7,856,759 B2 | 12/2010 | Elliott et al. | |
| 8,027,769 B2 | 9/2011 | Oualkadi et al. | |
| 8,418,405 B2 | 4/2013 | Yoshida et al. | |
| 8,727,926 B2 * | 5/2014 | Ishida .................. | E05F 15/646 475/157 |
| 8,857,890 B2 | 10/2014 | Okada et al. | |
| 8,950,117 B2 | 2/2015 | Djordjevic et al. | |
| 9,062,488 B2 | 6/2015 | Sasaki | |
| 9,174,517 B2 | 11/2015 | Scheuring et al. | |
| 9,260,901 B2 | 2/2016 | Ishida et al. | |
| 9,353,566 B2 | 5/2016 | Miu et al. | |
| 9,476,245 B2 | 10/2016 | Hansen | |
| 2004/0097318 A1 | 5/2004 | Greuel et al. | |
| 2004/0113456 A1 | 6/2004 | Greuel et al. | |
| 2005/0217075 A1 | 10/2005 | Enomoto | |
| 2006/0279243 A1 | 12/2006 | Schachtl et al. | |
| 2006/0289821 A1 | 12/2006 | Ritter | |
| 2009/0019773 A1 | 1/2009 | Gruhn et al. | |
| 2009/0120002 A1 | 5/2009 | Domholt | |
| 2009/0265989 A1 | 10/2009 | Mueller et al. | |
| 2013/0123056 A1 | 5/2013 | Ishida | |
| 2018/0023330 A1 | 1/2018 | Herrmann et al. | |
| 2018/0209194 A1 | 7/2018 | Rietdijk | |
| 2018/0216384 A1 | 8/2018 | Rietdijk | |
| 2018/0216392 A1 | 8/2018 | Rietdijk | |

FOREIGN PATENT DOCUMENTS

| | | |
|---|---|---|
| CN | 101802336 A | 8/2010 |
| CN | 101978128 A | 2/2011 |
| CN | 103025552 A | 4/2013 |
| CN | 103835612 A | 6/2014 |
| DE | 3247545 C2 | 6/1988 |
| DE | 3230065 C2 | 6/1989 |
| DE | 4041480 A1 | 6/1992 |
| DE | 4237786 A1 | 5/1993 |
| DE | 19547034 A1 | 6/1997 |
| DE | 19601948 C2 | 11/1998 |
| DE | 29802535 U1 | 6/1999 |
| DE | 10114938 A1 | 10/2001 |
| DE | 19809710 C2 | 11/2001 |
| DE | 10041710 A1 | 3/2002 |
| DE | 10117934 A1 | 10/2002 |
| DE | 10245136 A1 | 6/2003 |
| DE | 10331563 A1 | 2/2004 |
| DE | 10318674 A1 | 11/2004 |
| DE | 102004017264 A1 | 11/2004 |
| DE | 102004022680 A1 | 11/2005 |
| DE | 102004028760 A1 | 1/2006 |
| DE | 102004047314 A1 | 3/2006 |
| DE | 102004052590 A1 | 5/2006 |
| DE | 102005030053 A1 | 12/2006 |
| DE | 202006001250 U1 | 7/2007 |
| DE | 102006030986 A1 | 1/2008 |
| DE | 202008016929 U1 | 6/2010 |
| DE | 102014211138 A1 | 12/2015 |
| DE | 102014211141 A1 | 12/2015 |
| EP | 0170505 B1 | 1/1990 |
| EP | 0625625 B1 | 3/1997 |
| EP | 1108846 B1 | 3/2006 |
| EP | 1576250 B1 | 3/2007 |
| EP | 1576251 B1 | 3/2008 |
| EP | 1646918 B1 | 11/2008 |
| EP | 1614846 B1 | 4/2009 |
| EP | 1379752 B1 | 7/2009 |
| EP | 2503088 B1 | 12/2013 |
| FR | 2591271 A1 | 6/1987 |
| FR | 2903486 A1 | 1/2008 |
| JP | S58134252 A | 8/1983 |
| WO | WO 2006/089526 A2 | 8/2006 |
| WO | WO 2008/145373 A1 | 12/2008 |
| WO | WO 2009/043424 A1 | 4/2009 |

OTHER PUBLICATIONS

Chinese Office action dated Apr. 1, 2019 issued in related Chinese Application No. 201680048223.2, 10 pages, with English Translation, 6 pages.

(56) References Cited

OTHER PUBLICATIONS

Chinese Office action dated Apr. 1, 2019 issued in related Chinese Application No. 201680048222.8, 10 pages.
Office action dated Sep. 19, 2018 issued in related U.S. Appl. No. 15/746,339, 6 pages.

* cited by examiner

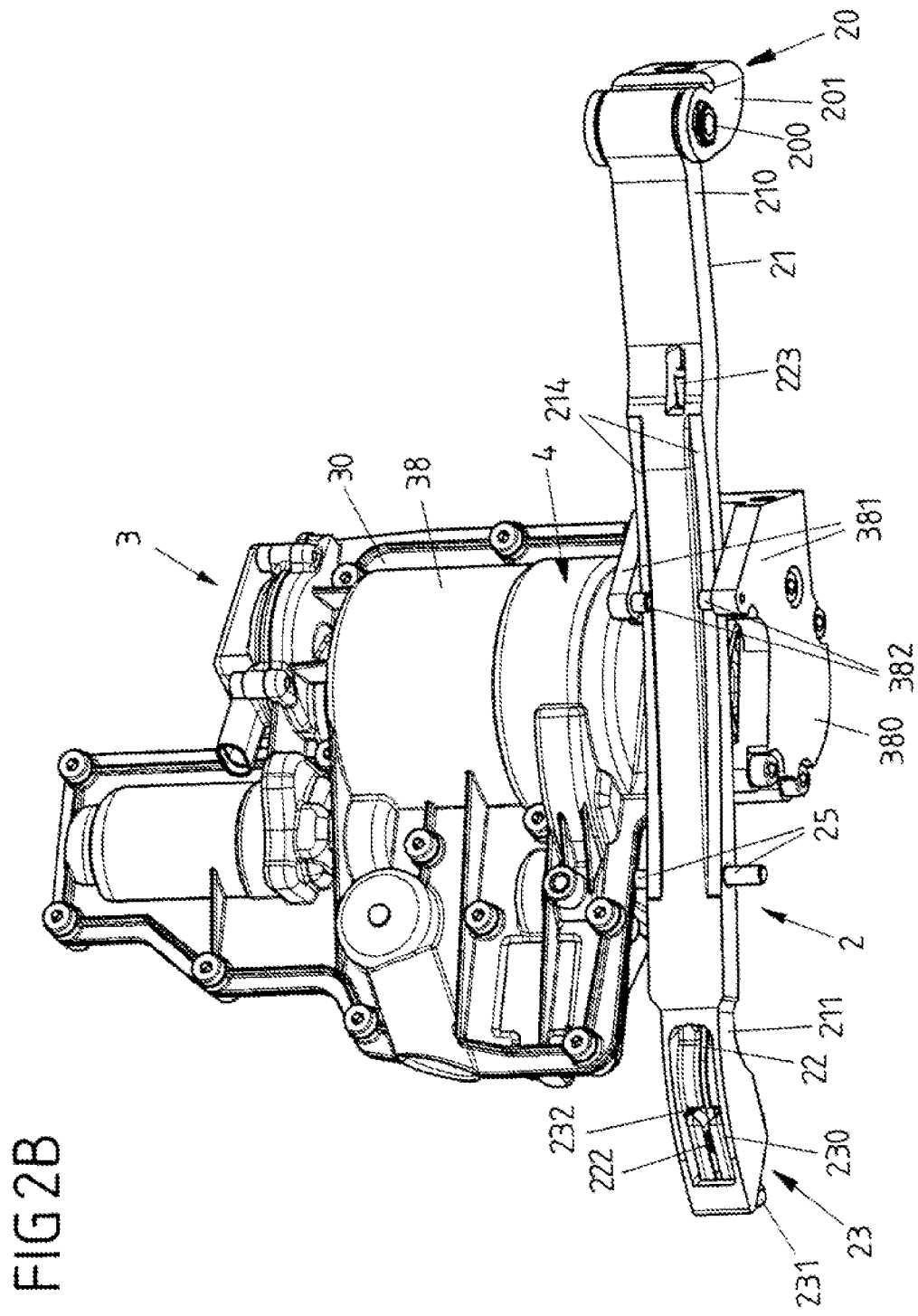

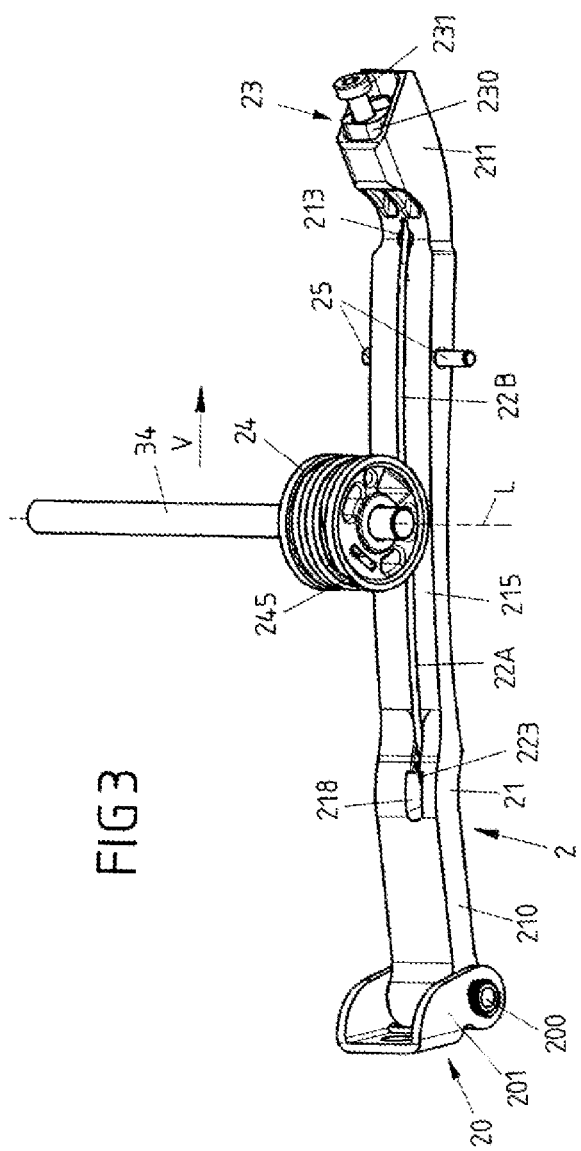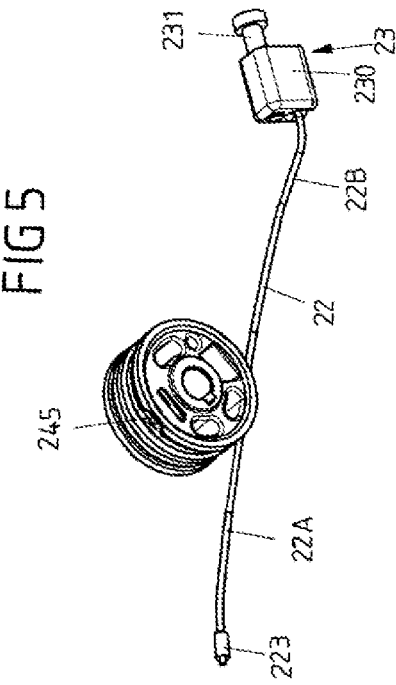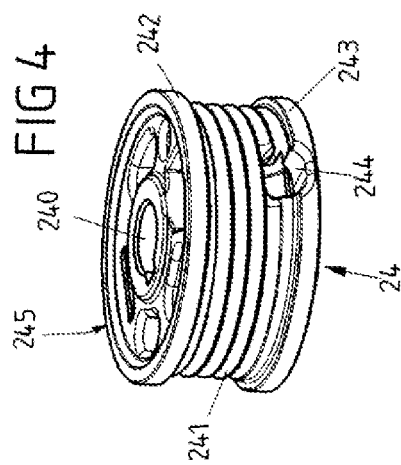

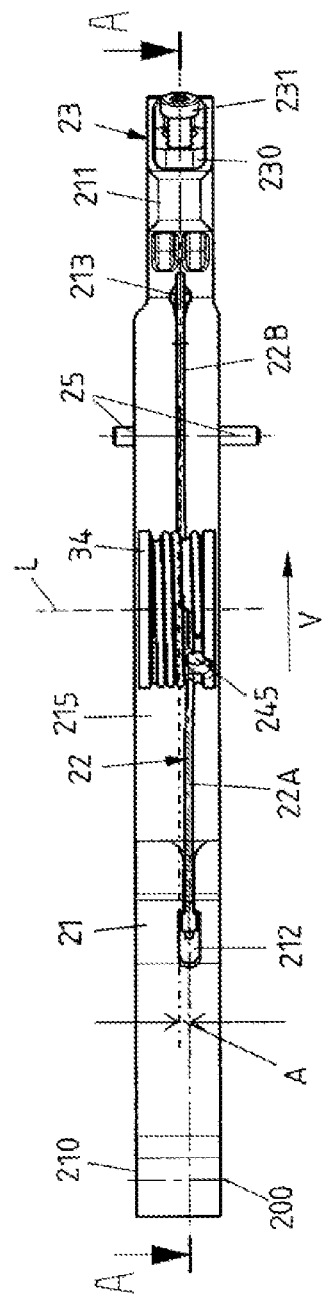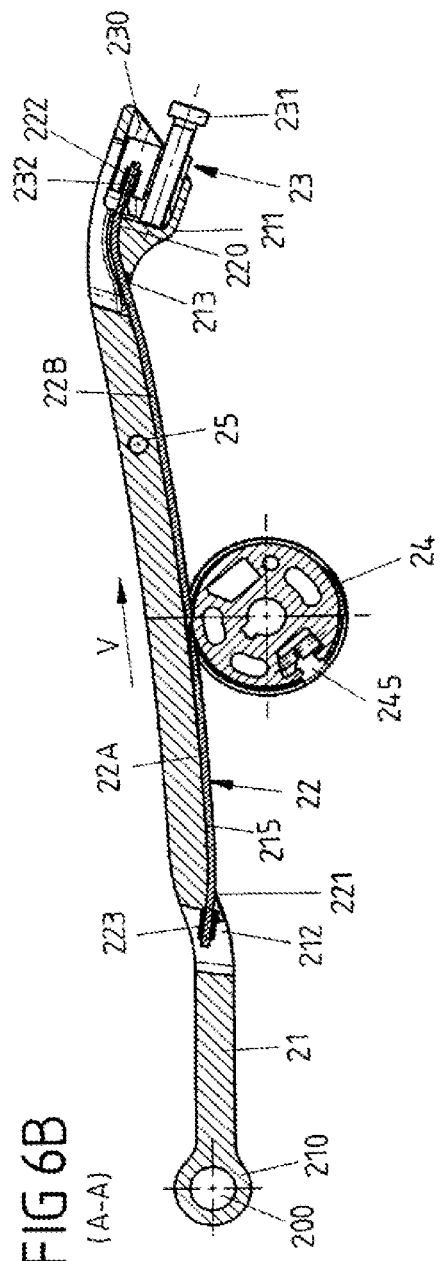

DEVICE FOR MANUALLY AND/OR ELECTROMOTIVELY ADJUSTING OR SECURING A FIRST VEHICLE PART AND A SECOND VEHICLE PART RELATIVE TO EACH OTHER

CROSS-REFERENCE TO A RELATED APPLICATION

This application is a National Phase Patent Application of International Patent Application Number PCT/EP2016/069338, filed on Aug. 15, 2016, which claims priority to German Patent Application Number 10 2015 215 630.3, filed on Aug. 17, 2015, the contents of all of which are included herein by reference.

BACKGROUND

The invention relates to a device for manually and/or electromotively adjusting or securing a first vehicle part and a second vehicle part relative to each other.

In particular, the device can serve for adjusting a door or a flap of a motor vehicle.

A device of this type comprises an adjustment part which has a joint for pivotable arrangement on the first vehicle part, wherein the adjustment part is to be arranged on the first vehicle part in such a manner that, when the vehicle parts are adjusted relative to each other, the adjustment part moves relative to the second vehicle part.

Such an adjustment part can be realized in particular by what is referred to as a rebound strap in the case of a vehicle door arranged in an articulated manner on a vehicle body. The rebound strap is coupled via a joint, for example, to the vehicle body, for example to what is referred to as the A pillar of the vehicle in the case of a vehicle front door. During (manual) pivoting of the vehicle door, the rebound strap moves relative to the vehicle door, wherein, for example, a securing device can act on the rebound strap, said securing device permitting the vehicle door to be secured in one or more opening positions in such a manner that the vehicle door cannot be readily moved out of a taken-up opening position and as far as possible only by conscious actuation by a user.

In particular in the case of a vehicle door, there is a need for a device which permits securing in one or more discretely defined or else infinitely variably continuous, i.e. any desired, opening positions. It is desirable in this case to be able to use a device optionally with or without an electromotive drive, i.e. as a pure securing device or additionally also as a motor-driven adjusting device without a substantial reconfiguration of the device per se being required for use of an electromotive drive.

FR 2591271 A1 discloses an adjustment device for a pivoting door, in which a belt is laid around deflection pulleys and is drivable by motor in order to adjust the pivoting door.

SUMMARY

It is an object of the present invention to provide a device for manually or electromotively adjusting and/or securing two vehicle parts relative to each other, said device being able to be used in the manner of a construction kit either as a purely mechanical securing or adjusting device or as an electromotive adjusting device.

This object is achieved by subject matter with features as described herein.

According thereto, the device comprises
a traction cable which is fastened at a first end and at a second end to the adjustment part, and
a cable drum which is to be arranged on the second vehicle part, is rotatable about a longitudinal axis and on which the traction cable is arranged in such a manner that, when the second vehicle part is adjusted relative to the first vehicle part, the traction cable is wound up with one portion on the cable drum and is unwound with another portion from the cable drum.

This is based on the concept of, in the case of a device for securing or adjusting two vehicle parts relative to each other, making use of a securing and/or driving device in which a flexible force transmission element which is substantially flexurally slack per se and is in the form of a traction cable designed for transmitting tensile forces is arranged on an adjustment part and is laid around a cable drum in such a manner that, during movement relative to each other of the vehicle parts to be adjusted, the traction cable rolls on the cable drum. The traction cable is fixed on the adjustment part, which is to be arranged in an articulated manner on the first vehicle part, and, for this purpose, is fastened at both of its ends to the adjustment part. By contrast, the cable drum is to be arranged on the second vehicle part and is operatively connected to the traction cable by the traction cable being laid around the cable drum. Via the cable drum which is operatively connected to the traction cable, a braking force can therefore be brought about between the vehicle parts for securing the vehicle parts relative to each other, or an adjustment force can be introduced for adjusting the vehicle parts relative to each other and therefore the device can be used as a securing device or as a manually or electromotively drivable adjusting device.

The adjustment part can be realized, for example, as what is referred to as a rebound strap. The adjustment part can be fixed, for example, in an articulated manner on a vehicle body (which in this case realizes the first vehicle part). A vehicle door (which in this case realizes the second vehicle part) is arranged on the vehicle body in an articulated manner, wherein the rebound strap moves relative to the vehicle door when the vehicle door is pivoted.

When the vehicle parts move relative to each other, the traction cable (which is arranged on the adjustment part fixed on the first vehicle part) moves relative to the cable drum (which is arranged on the second vehicle part). By providing, for example, a braking device which acts on the cable drum, a braking force can be brought about which secures the vehicle parts in a position relative to each other. Alternatively or additionally, adjustment of the vehicle parts relative to each other can be brought about by driving of the cable drum by means of an electromotive drive device.

In one exemplary embodiment, the cable drum has at least one fastening device for positive locking fastening of the traction cable to the cable drum. The traction cable is fixed in a positive locking manner to the cable drum via the fastening device, and therefore, when the cable drum rotates about the longitudinal axis, the traction cable rolls on the cable drum and a portion winds up onto the cable drum, while another portion is unwound from the cable drum. The traction cable is therefore fixed on the cable drum via the fastening device in a slip-free manner, and therefore, during rotation, the cable drum is moved relative to the traction cable.

In an advantageous refinement, the cable drum has two fastening devices on which different portions of the traction cable are fixed in a positive locking manner. Thus, a first portion of the traction cable can be inserted into a first fastening device, and therefore the first portion of the traction cable is held on the cable drum in a positive locking manner via said first fastening device. By contrast, a second portion of the traction cable can be inserted into a second fastening device, and therefore the second portion of the traction cable is also connected to the cable drum in a positive locking manner via the second fastening device. In this case, the traction cable is preferably of two-part design with two cable portions which are present in a manner separated from each other. The first portion is connected at one end to the adjustment part and at the other end to the cable drum. Equally, the second portion of the traction cable is connected at one end to the adjustment part and at the other end to the cable drum.

The fastening devices can be formed, for example, by means of what are referred to as nipple chambers, into which in each case one end of a portion of the traction cable with a cable nipple arranged thereon can be inserted, such that, in the inserted position, the portion of the traction cable is held in the nipple chamber in a positive locking manner.

The fastening devices are arranged, for example, on different sides of the cable drum (with respect to the longitudinal axis) and are therefore offset with respect to one another along the longitudinal axis. The effect which can thereby be achieved is that, in an approximately central position in which the two portions of the traction cable are each wound up onto the cable drum by approximately the same length, the portions of the traction cable extend from the cable drum approximately centrally (with respect to the longitudinal axis) in different directions.

The traction cable is preferably accommodated with its portions in a cable groove encircling the cable drum and lies in the cable groove. When the cable drum is rotated, one portion of the traction cable is wound further into the cable groove, while the other portion of the traction cable is unwound from the cable groove. An ordered, defined winding up or unwinding of the traction cable onto or from the cable drum is therefore ensured via the cable groove.

The adjustment part preferably has, on a first side, a running surface against which the cable drum lies. When the cable drum rotates about the longitudinal axis, the cable drum rolls on said running surface and therefore moves relative to the adjustment part.

In order to provide a favorable movement here of the cable drum on the adjustment part, the cable drum has, for example, at least one preferably closed running ring which encircles the longitudinal axis and via which the cable drum rolls on the running surface. In a specific refinement, the cable drum can have, for example, two running rings which are spaced apart from each other along the longitudinal axis and accommodate the cable groove between them and therefore delimit same at different sides (as viewed along the longitudinal axis). The running rings protrude radially outward beyond the cable groove, and therefore, when the cable drum rolls on the running surface, only the running rings are in contact with the running surface of the adjustment part, whereas the traction cable does not come into contact at the cable groove with the running surface and in particular is not squeezed in the cable groove. This ensures a favorable, defined movement of the cable drum on the adjustment part.

The cable drum is accommodated in a cable drum housing which is arranged on the second vehicle part. The cable drum housing is held in a fixed position on the second vehicle part, and the cable drum is mounted rotatably in the cable drum housing.

The cable drum housing is guided here on the adjustment part, and therefore the cable drum can move in a defined position along the adjustment part via the cable drum housing. Via the guiding of the cable drum housing on the adjustment part, it can be ensured in particular that, during rotation, the cable drum rolls on the adjustment part, does not lose contact in the process with the adjustment part and moves along a defined path relative to the adjustment part.

For the guiding on the adjustment part, the cable drum housing has, for example, one or two limb elements, via which the cable drum housing is guided on the adjustment part. Each limb element engages around the adjustment part (in the case of two limb elements, the limb elements engage around the adjustment part on different sides) and is guided on the adjustment part via a guide element on a side facing away from the cable drum. The guide element can be designed, for example, as a guide pin which projects from the limb element along the longitudinal axis and, during adjustment of the cable drum, slides along the adjustment part and therefore provides guiding of the cable drum on the adjustment part.

For this purpose, for advantageous guiding, a guide track, for example in the form of a groove or the like, can be arranged on the adjustment part, on the side facing away from the cable drum, in which guide track the guide element lies and is therefore guided in a defined manner along the adjustment part.

The traction cable is preferably fixed at its first end and at its second end on the adjustment part in a non-positive locking and/or positive locking manner. For example, it is possible to provide for each end on the adjustment part a fastening device in the form of a nipple chamber in which that end of the traction cable which bears a cable nipple engages in a positive locking manner, and therefore the end of the traction cable is fixed to the adjustment part in a positive locking manner via said engagement.

The fastening devices assigned to the ends of the traction cable are preferably arranged here on the adjustment part along the longitudinal axis in a manner offset with respect to one another. This makes it possible to achieve an advantageous entry into the cable drum for each portion of the traction cable.

In order to be able to set the traction cable length extended freely on the adjustment part, in one refinement a setting device, on which the first end or the second end of the traction cable is arranged, can be arranged on the adjustment part in the region of a fastening device. The associated end of the traction cable is held on the adjustment part via the setting device, wherein, by adjustment of a setting element of the setting device relative to the adjustment part, the freely extended length of the traction cable can be set.

In this context, the freely extended traction cable length is understood as meaning the traction cable length which is extended between the fastening locations at which the ends of the traction cable are fixed on the adjustment part. The traction cable is fastened at both of its ends to the adjustment part. However, between its two ends, the traction cable extends freely with respect to the adjustment part and is laid around the cable drum.

The device which is provided is usable in the manner of a construction kit either as a purely mechanical securing device for the braking holding of the vehicle parts relative to each other in an adjustment position which has been taken up, or as an electromotively operated adjusting device for adjusting the vehicle parts relative to each other. In particular, the device can optionally be used with or without an electromotive drive without the basic design of the device having to be substantially changed for this purpose.

In order to use the device as an electromotively driven adjusting device, it can be provided in particular that an electromotive drive device acts on the cable drum and adjusts the cable drum electromotively. The drive device preferably comprises a drive motor and a transmission coupling the drive motor to the cable drum. The drive motor is preferably designed as an electric motor. The transmission produces a connection between the drive motor and the cable drum, and therefore an adjustment force can be transmitted to the cable drum via the transmission.

In an advantageous refinement, the transmission is of switchable design. The transmission can thus preferably be switched between a coupling state, in which the drive motor is coupled to the cable drum, a freewheeling state, in which the coupling between the drive motor and the cable drum is interrupted, and a braking state, in which a braking action is brought about during the movement of the adjustment parts relative to each other. The transmission therefore permits both an electromotive adjustment of the vehicle parts relative to each other and also a manual adjustment. If the vehicle parts are intended to be adjusted electromotively relative to each other, the transmission is brought into its coupling state, and therefore coupling is produced between the drive motor and the cable drum and the vehicle parts can be adjusted electromotively relative to each other by driving of the cable drum. If the vehicle parts are intended to be moved manually relative to each other, the transmission is, by contrast, brought into the freewheeling state or the braking state, and therefore the cable drum is decoupled from the drive motor and is movable freely (i.e. with little friction) in the freewheeling state, whereas it is movable in a manner braked in a defined way in the braking state. The cable drum can therefore be moved independently of the drive motor, which permits manual adjustment of the vehicle parts relative to each other without the drive motor also having to be moved in the process.

The transmission is preferably of self-locking design. This permits, for example, securing of the vehicle parts relative to each other in an adjustment position which has just been taken up (if the transmission is not driven electromotively) by a braking force which fixes the vehicle parts relative to each other in an adjustment position which is taken up being brought about by the transmission, and therefore movement of the vehicle parts relative to each other is blocked, and manual adjustment independently of the drive motor is not possible.

In a specific refinement, the transmission can be designed as a planetary gear transmission. A planetary gear transmission of this type comprises a housing portion, a first planetary gear stage which has a first carrier element and at least one first planetary gear arranged on the first carrier element, and a second planetary gear stage which has a second carrier element and at least one second planetary gear arranged on the second carrier element. The planetary gear transmission furthermore has a first ring gear part which is in toothing engagement with the at least one first planetary gear, and a second ring gear part which is in toothing engagement with the at least one second planetary gear. A drive element can be driven, for example, by an electromotive drive motor. An adjustment force can be transmitted to the cable drum via the first planetary gear stage and the second planetary gear stage by driving of the drive element.

The first ring gear part and the second ring gear part are preferably connected to each other for conjoint rotation. The first ring gear part and the second ring gear part can be formed, for example, integrally with each other, wherein it is also conceivable and possible, however, to manufacture the first ring gear part and the second ring gear part as separate components and then to connect them to each other for conjoint rotation. Each ring gear part bears an internal toothing which is in engagement with the planetary gears of the respectively assigned planetary gear stage.

In addition, the first planetary gear stage preferably has a first sun gear which is in engagement with the at least one first planetary gear, and the second planetary gear stage has a second sun gear which is in engagement with the at least one second planetary gear and is different from the first sun gear. For transmitting an adjustment force from the drive element to the cable drum, one of the sun gears can be secured relative to the housing portion, and the other of the sun gears is connected to the cable drum for transmitting the adjustment force.

This is based on the concept of providing a planetary gear transmission which has two planetary gear stages with different sun gears. For transmitting an adjustment force, for example, a ring gear comprising the first ring gear part and the second ring gear part can be driven, as a result of which, when the second sun gear is held in place, the adjustment force is transmitted to the first sun gear and, via the latter, to the cable drum. Such an arrangement of a planetary gear transmission makes, for example, a large step-down ratio possible with a simultaneously high degree of efficiency of the transmission and low-noise operation.

The first planetary gear stage and the second planetary gear stage can have, for example, at least two, preferably three or four or else more planetary gears in each case. The planetary gears of a planetary gear stage are preferably spaced apart identically from one another here. If, for example, four planetary gears are provided, said planetary gears have an angular offset of 90° with respect to one another.

In principle, it is not necessary here for the planetary gear stages to have the same number of planetary gears. For example, it is also conceivable for one planetary gear stage to have three planetary gears and for the other planetary gear stage to have four planetary gears.

In the case of the planetary gear transmission, the sun gears are separated from one another and can in particular rotate independently of one another. This makes it possible to hold one of the sun gears in place, while the other sun gear is connected to the cable drum and therefore serves for transmitting the adjustment force to the cable drum. The first carrier element of the first planetary gear stage and the second carrier element of the second planetary gear stage are preferably connected to each other here for conjoint rotation, and therefore, when one carrier element is rotated, the other carrier element is carried along.

The planetary gear transmission preferably has a central shaft on which the first sun gear, the second sun gear and the cable drum are arranged. The shaft extends along the longitudinal axis and is rotatable about the longitudinal axis relative to the (stationary) housing section. The cable drum is also arranged on the shaft for rotation therewith. If the second sun gear is held in place and the first sun gear serves for transmitting the adjustment force to the cable drum, the first sun gear is also arranged on the shaft for rotation therewith, and therefore the shaft can be rotated via the first sun gear and the cable drum can be driven via said shaft. By contrast, the second sun gear is rotatable with respect to the shaft, and therefore the shaft can be moved relative to the second sun gear.

It is basically insignificant which of the sun gears is held in place. It is also conceivable and possible, for example, to hold the first sun gear in place and to arrange the second sun gear on the shaft for rotation therewith, and therefore an adjustment force is transmitted to the cable drum via the second sun gear. The step-down or step-up brought about by the transmission is identical, irrespective of which sun gear is held in place.

The internal toothing of the first ring gear part and the internal toothing of the second ring gear part preferably have a different modulus and/or a different number of teeth.

The modulus of a toothing is understood as meaning a dimension for the size of the teeth of gearwheels. The modulus is defined here as the quotient of gearwheel pitch and the pi number π. The pitch circle diameter of a gearwheel is defined by the number of teeth multiplied by the modulus of the toothing. The pitch circle is understood as meaning a circle through the centers of the teeth of the toothing. The pitch circle diameter corresponds to the diameter of said pitch circle.

Additionally or alternatively, the at least one first planetary gear and the at least one second planetary gear also have a different modulus and/or a different number of teeth.

Additionally or alternatively in turn, the first sun gear and the second sun gear finally also have a different modulus and/or a different number of teeth.

For example, it follows, depending on the modulus and the number of teeth, that the pitch circle diameters
  of the first ring gear part and of the second ring gear part,
  of the at least one first planetary gear and of the at least one second planetary gear, and/or
  of the first sun gear and of the second sun gear differ.

The different moduli and the different numbers of teeth and/or different pitch circle diameters make it possible, for example, to set a large step-down. In this manner, a comparatively high rotational speed of the ring gear comprising the first ring gear part and the second ring gear part can be stepped down into a comparatively low rotational speed of the first sun gear (when the second sun gear is held in place). In particular, owing to the different moduli and the different numbers of teeth and the resulting different pitch circle diameters, a relative movement between the first sun gear and the second sun gear occurs, and therefore, when the second sun gear is held in place, the first sun gear can be driven at a stepped-down rotational speed and, via the latter, the output element, which is coupled to the first sun gear, can be set into a rotational movement.

By adaptation of the moduli and the numbers of teeth and/or the pitch circle diameters, the step-down or step-up can be set in a desired manner, wherein large step-down or step-up ratios are also possible.

In order to adapt the transmission to a different rotational speed, it is possible, for example, merely to exchange one planetary gear stage together with the associated ring gear part. By contrast, other parts of the transmission can continue to be used, and therefore at least some of the components can be taken across.

Owing to a high step-down, the planetary gear transmission is preferably of self-locking design, and therefore, when used, for example, on a vehicle door, the transmission secures the vehicle door in an adjustment position which has been taken up.

In an advantageous refinement, the drive element is in toothing engagement with an external toothing on one of the ring gear parts. For example, a ring gear comprising the ring gear parts can have a base part on which the external toothing is formed and which is connected, for example integrally, to the ring gear parts for rotation therewith. The drive element is therefore used to drive the ring gear, the comparatively high rotational speed of which is transmitted to the output element in a stepped-down manner via the planetary gear stages.

The drive element can be designed, for example, as a spur gear or worm gear. The drive element can itself engage with the external toothing of the ring gear here in a stepping-down manner, and therefore the step-down of the planetary gear transmission is further increased via the drive element in engagement with the ring gear.

The step-down can therefore (also) be set via the engagement of the drive element with the ring gear.

The planetary gear transmission is preferably switchable between a coupling state, a braking state and a freewheeling state by means of the switching device. In the coupling state, the second sun gear is locked relative to the housing section and is therefore held in place. In the braking state, although the cable drum is movable relative to the drive element, it is braked (in a defined manner) in the process. In the freewheeling state, the locking is removed, and therefore the second sun gear is not secured and can be rotated relative to the housing section. In the coupling state, a force flux is produced between the drive element and the cable drum, while, in the braking state and the freewheeling state, the cable drum can move relative to the drive element.

If the transmission is of self-locking design, the transmission blocks an output-side force in the coupling state, and therefore the cable drum is secured. If the planetary gear transmission serves, for example, for adjusting a vehicle door, movement of the vehicle door in the coupling state independently of the motorized drive driving the transmission is not possible. Only when the transmission is switched into its braking state or its freewheeling state and therefore the force flux between the cable drum and the drive element is canceled can the output-side cable drum be adjusted independently of the transmission and the drive motor and therefore is not secured.

In the braking state and the freewheeling state, movement of the adjustment part coupled to the cable drum is possible. In the freewheeling state, coupling between the drive element, which is connected to a drive motor, and the cable drum is removed, and therefore, for example, manual adjustment can take place in a smooth-running manner independently of the drive motor. In the braking state, the cable drum is braked while, in the freewheeling state, the braking is removed and therefore the adjustment part is movable in a smooth-running manner.

In a specific refinement, the transmission is switched between the different states by means of a switching device which has a brake pot connected to the second sun gear, and at least one switching element which is arranged on a carrier, so as to be adjustable between a coupling position, a braking position and a freewheeling position. The carrier is fixed in position with respect to the housing section of the transmission. One or more switching elements, for example in the form of adjustable brake shoes, are arranged on the carrier and, for switching between the different states, can be brought into blocking contact with the brake pot (in the coupling state), into braking, rubbing contact with the brake pot (in the braking state) and out of contact with the brake pot (in the freewheeling state).

In the coupling position, in which the switching elements are pressed into contact with the brake pot with a comparatively great force, the brake pot is secured in its position relative to the carrier and therefore relative to the housing section of the transmission on which the carrier is arranged, and therefore the brake pot and consequently also the second sun gear which is connected to the brake pot cannot be moved relative to the carrier. The second sun gear is thereby held in place, and therefore a force flux between the drive element and the cable drum is produced via the transmission and consequently the cable drum can be adjusted for driving via the drive device, whereas output-side forces are blocked and therefore the cable drum is secured (when the drive device is not energized).

By contrast, although the switching elements are in contact with the brake pot in the braking position, they permit movement of the brake pot relative to the switching elements with friction, and therefore, although the second sun gear is movable by means of said rubbing, braking contact, it is braked in the process. In said braking position, the cable drum can therefore be basically moved independently of the drive device, but is braked in the process.

In the braking position, the switching elements are pressed against the brake pot with reduced force (in relation to the coupling position).

Finally, in the freewheeling position, the switching elements are out of contact with the brake pot. This permits free adjustment of the brake pot relative to the carrier, and therefore the force transmission train between the cable drum and the drive device is interrupted and, consequently, the cable drum can be adjusted independently of the drive device. In the freewheeling position, adjustment of the cable drum is therefore possible in a smooth-running, low-friction manner.

It should be noted in this regard that, in the freewheeling position, the switching elements are not necessarily completely out of contact with the brake pot. It is also conceivable and possible that, in the freewheeling position, the switching elements are in dragging, but only slightly braking contact with the brake pot.

The switching elements can be adjusted between their different positions preferably via an adjusting element which is connected to an electromotive actuator. The actuator can use, for example, a pinion transmission to drive the adjusting element, which is connected to a lever, and therefore the switching elements can be moved by adjusting of the adjusting element.

In an advantageous refinement, the switching elements are prestressed in the direction of their freewheeling position via one or more prestressing elements. In this case, the adjusting element can be configured in such a manner that, for adjusting the switching elements out of the freewheeling position, said adjusting element presses the switching elements into contact with the brake pot in order to bring the switching elements into the braking position or into the coupling position. The switching elements can then be reset in a spring-assisted manner by means of the prestressing element prestressing them.

BRIEF DESCRIPTION OF THE DRAWINGS

The concept on which the invention is based will be explained in more detail below with reference to the exemplary embodiments illustrated in the figures.

FIGS. 2A, 2B show perspective views of a device for adjusting and securing two vehicle parts relative to each other.

FIG. 3 shows a view of an assembly of the device with an adjustment part, a traction cable arranged on the adjustment part and a cable drum connected to the traction cable.

FIG. 4 shows a separate view of the cable drum.

FIG. 5 shows a separate view of the cable drum with a traction cable arranged thereon.

FIG. 6A shows a top view of the adjustment part with a traction cable arranged thereon and a cable drum arranged thereon.

FIG. 6B shows a sectional view along the line A-A according to FIG. 6A.

DETAILED DESCRIPTION

Figure 1:
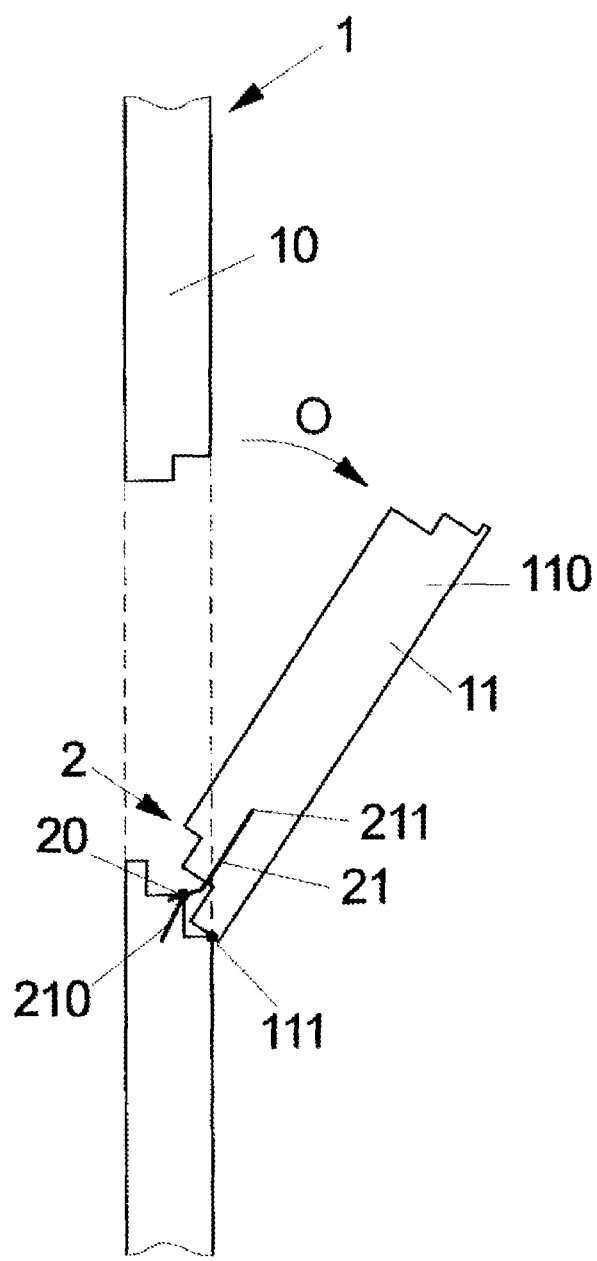
FIG. 1 shows a schematic view of a vehicle door on a vehicle body, with an adjustment part in the form of a rebound strap arranged in an articulated manner on the vehicle body and moving relative to the vehicle door when the vehicle door is pivoted.

FIG. 1 shows a schematic view of a vehicle 1 with a vehicle body 10 and a vehicle door 11 which is arranged on the vehicle body 10 in an articulated manner about a door hinge 111 and can be pivoted along an opening direction O relative to the vehicle body 10 in order to open up or to close a door opening.

A device 2 which has an adjustment part 21 in the form of a rebound strap and serves for securing and/or adjusting the vehicle door 11 relative to the vehicle body 10 acts between the vehicle body 10 and the vehicle door 11. The adjustment part 21 in the form of the rebound strap is arranged in an articulated manner about a joint 20 on the vehicle body 10, for example on the A pillar of the vehicle 1, and moves relative to the vehicle door 11 during pivoting of the vehicle door 11. For this purpose, the adjustment part 21 projects at one end 211 into an interior 110 of the vehicle door 11 and moves in said door interior 110 during adjustment of the vehicle door 11.

Figure 2A:
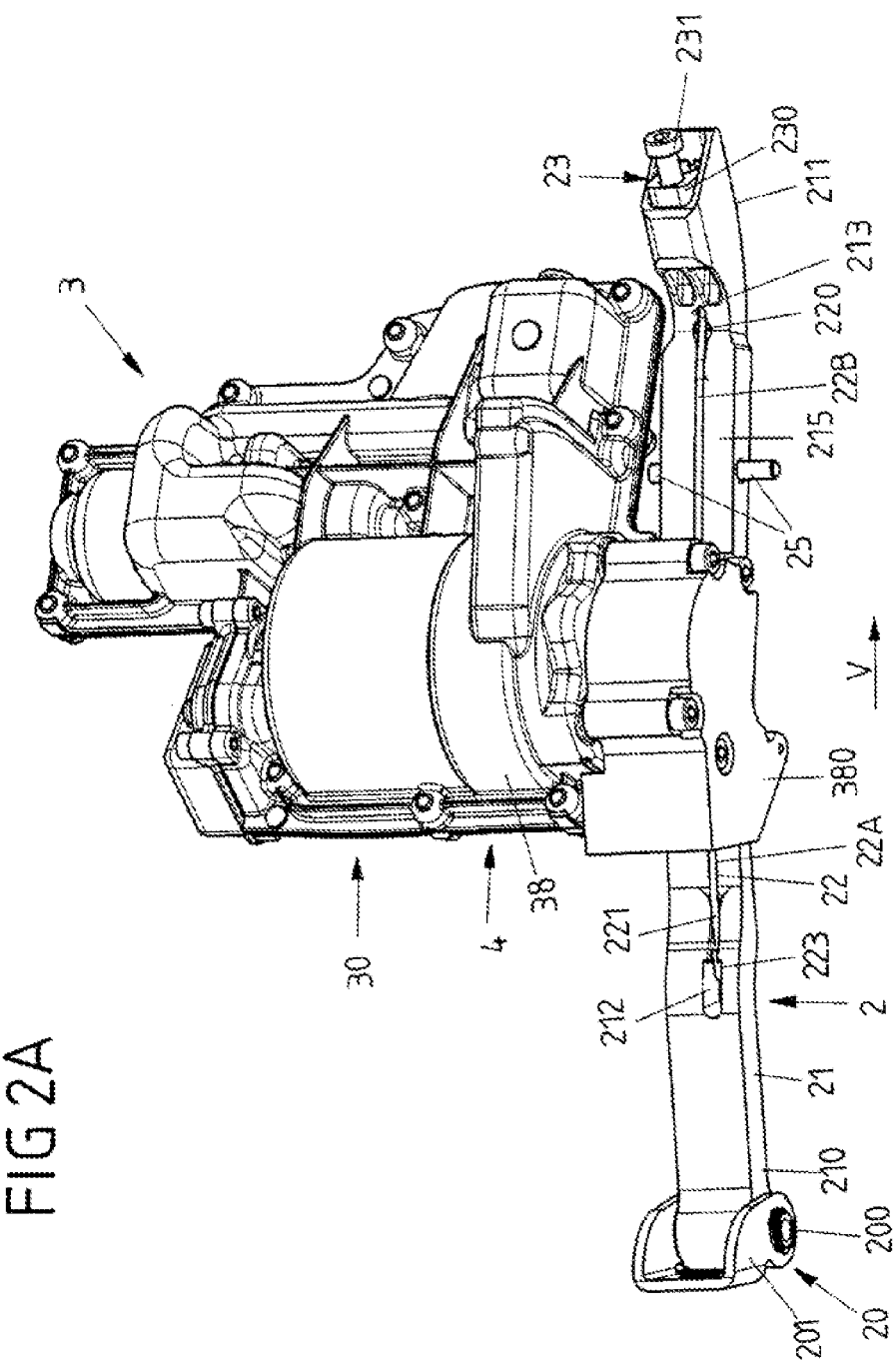
Figure 7:
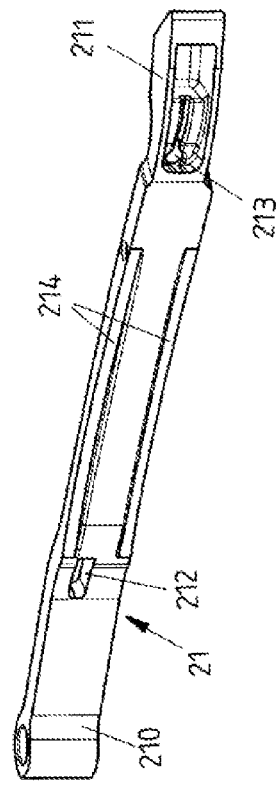
FIG. 7 shows a separate view of the adjustment part.

Perspective views of an exemplary embodiment of a device 2 of this type are illustrated in FIGS. 2A and 2B. The adjustment part 21 in the form of the rebound strap bears at one end 210 a joint 20 with a fastening part 201, with respect to which the adjustment part 21 is pivotable in an articulated manner about an axis of articulation 200. The fastening part 201 can be fixed on the vehicle body 10, for example the A pillar of the vehicle 1, in order thereby to connect the adjustment part 21 to the vehicle body 10 in an articulated manner.

At its end 211 facing away from the end 210, the adjustment part 21 extends into the interior 110 of the vehicle door 11. The adjustment part 21 is operatively connected here to the vehicle door 11 in order to secure the vehicle door 11 in an adjustment position taken up relative to the vehicle body 10 and/or in order to permit an electromotive or manual adjustment of the vehicle door 11 relative to the vehicle body 10.

The basic design of an assembly of said device 2, the assembly producing the operative connection between the vehicle parts 10, 11, is illustrated in FIGS. 3 to 8.

A flexible force transmission element which transmits tensile forces and is in the form of a traction cable 22, for example a steel or plastics cable, is arranged on the adjustment part 21. The traction cable 22 has two different portions 22A, 22B which are formed separately from each other and are connected firstly to the adjustment part 21 and secondly to a cable drum 24.

For this purpose, each portion 22A, 22B is inserted at one end into an associated fastening device 212, 213 of the adjustment part 21 and is held at the other end on the cable drum 24. The portions 22A, 22B thereby extend along a running surface 215 of the adjustment part 21 and are partially wound up onto the cable drum 24.

The cable drum 24 is arranged on a shaft 34, which is extended longitudinally along a longitudinal axis L, and is rotatable about the longitudinal axis L. As is apparent from the separate view according to FIG. 4, the cable drum 24 has a cable groove 241 which encircles the cable drum 24 in the manner of a threaded groove and in which the portions 22A, 22B lie. Said cable grooves 241 is bounded on both sides by running rings 242, 243 which protrude radially outward beyond the cable drum 24 and constitute closed rings with which the cable drum 24 is in contact with the running surface 215 of the adjustment part 21 in such a manner that, when the cable drum 24 rotates about the longitudinal axis L, the cable drum 24 rolls on the running surface 215 of the adjustment part 21.

Fastening devices 244, 245 in the form of what are referred to as nipple chambers are arranged on the cable drum 24, in manner lying diametrically opposite and in each case adjacent to one of the running rings 242, 243, in which nipple chambers a respectively associated portion 22A, 22B of the traction cable 22 lies at one end and is therefore held on the cable drum 24 in a slip-free manner.

When the cable drum 24 rotates about the longitudinal axis L, one of the portions 22A, 22B (depending on the direction of rotation) is wound up onto the cable drum 24, while the other portion 22B, 22A is unwound from the cable drum 24. The traction cable 22 does not change its length of extent on the adjustment part 21 here. On the contrary, the rotating of the cable drum 24 leads to an adjustment of the adjustment part 21 relative to the cable drum 24 along an adjustment direction V, and therefore, by driving of the cable drum 24, the adjustment part 21 and therefore the vehicle parts 10, 11 can be moved relative to one another.

Additionally or alternatively, during manual adjustment of the finished parts 10, 11 with respect to each other, a braking action can also be provided via the cable drum 24 in order to fix the vehicle parts 10, 11 in a position just taken up relative to each other or to influence the adjusting movement by braking during the adjustment.

The cable drum 24 is connected to the shaft 34 in a positive locking manner and thereby for rotation therewith. As will be further explained below, in the case of the exemplary embodiment illustrated, the shaft 34 is part of a transmission 30, via which the cable drum 24 can be acted upon for the adjustment or securing.

The first portion 22A of the traction cable 22 extends between a fastening device 212 of the adjustment part 21 and the cable drum 24 and is inserted in a positive locking manner with a cable nipple 223 at one end of the cable into the fastening device 212, which is configured as a nipple chamber.

The other, second portion 22B extends between the cable drum 24 and a setting device 23 which serves for setting the freely extended length of the traction cable 22 on the adjustment part 21. The setting device 23 has a slide 230 and a clamping element 231 and is arranged at that end 211 of the adjustment part 21 which is remote from the joint 20.

As is apparent in particular from the sectional view according to FIG. 6B, the second portion 22B of the traction cable 22 is guided through an opening 213 of the adjustment part 21 and inserted with a cable nipple 222 into a nipple chamber 232 of the slide 230. The position of the slide 230 at the end 211 of the adjustment part 21 can be changed via the clamping element 231 in order thereby to clamp the second portion 22A and therefore the traction cable 22 as a whole on the adjustment part 21. Cable slack in the traction cable 22 can therefore be compensated for by means of the setting device 23.

For arranging the traction cable 22 on the adjustment part 21, for example, the traction cable 22 can be first of all fastened with its portions 22A, 22B to the cable drum 24 and at least partially wound around the cable drum 24. Then, for example, first of all the second portion 22B can be inserted with its cable nipple 222 into the nipple chamber 232 of the slide 230 by the portion 22B being guided with the cable nipple 222 through the opening 213 in the adjustment part 21 and being inserted into the associated nipple chamber 232 of the slide 230. The other, first portion 22A can then also be inserted with its cable nipple 223 into the nipple chamber 212 on the adjustment part 21 in order then to clamp the traction cable 22 in the desired manner by means of the setting device 23.

Figure 8:
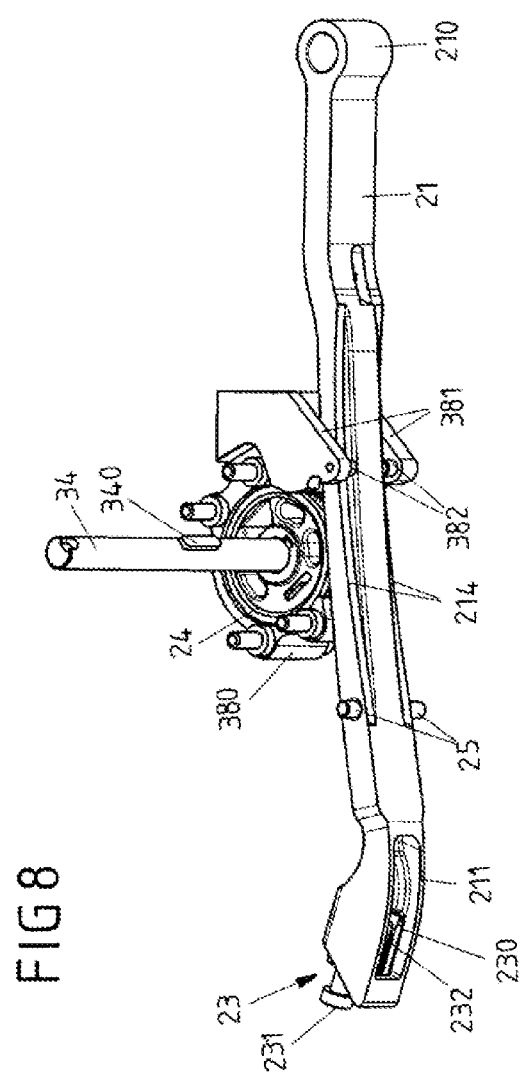
FIG. 8 shows a view of the adjustment part with the cable drum which is enclosed in a cable drum housing and is guided on the adjustment part.
Figure 9:
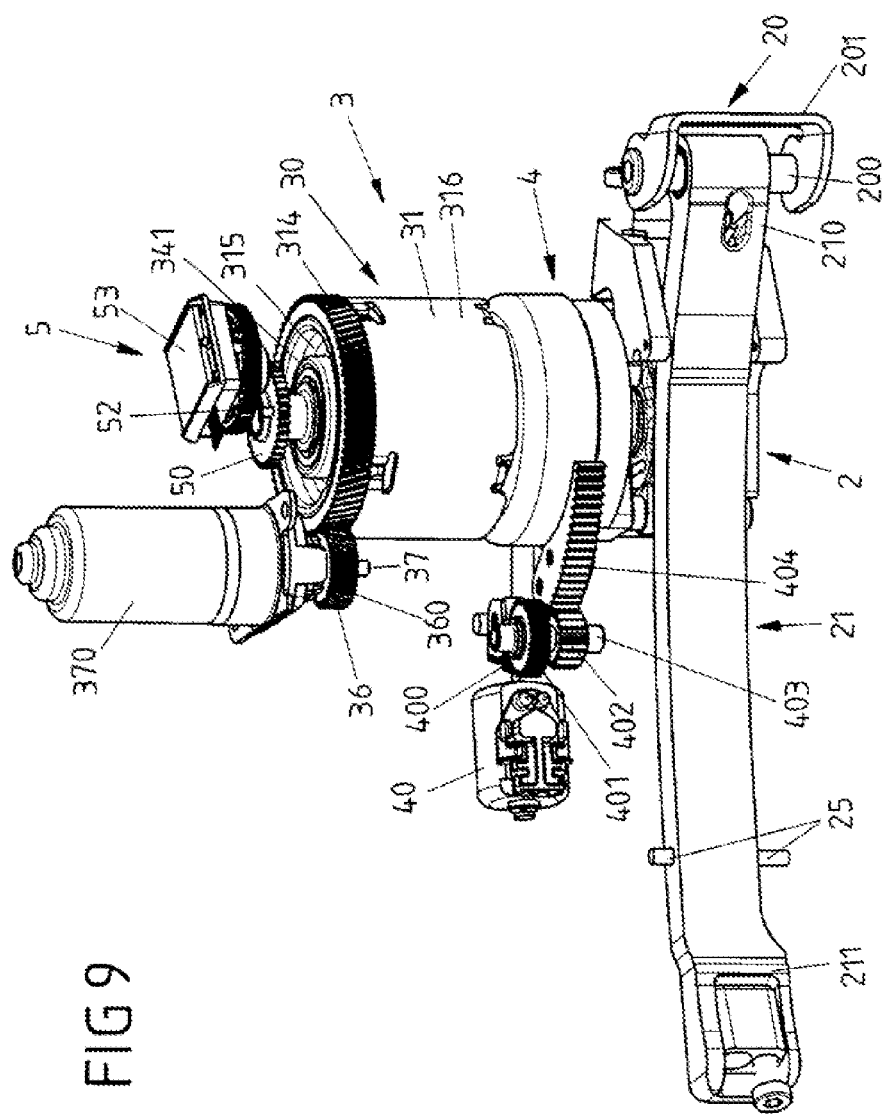
FIG. 9 shows a view of the device with a drive device.
Figure 10B:
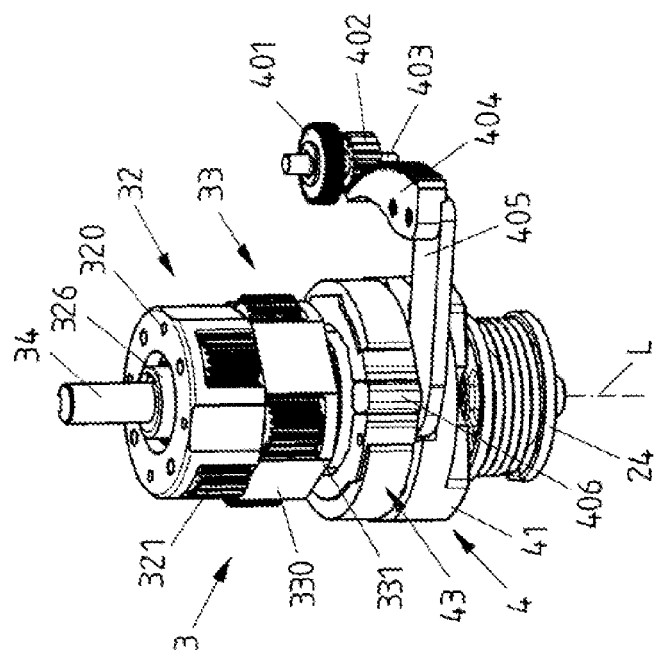
FIG. 10B shows a view of the drive device, illustrating two planetary gear stages of the planetary gear transmission.
Figure 10A:
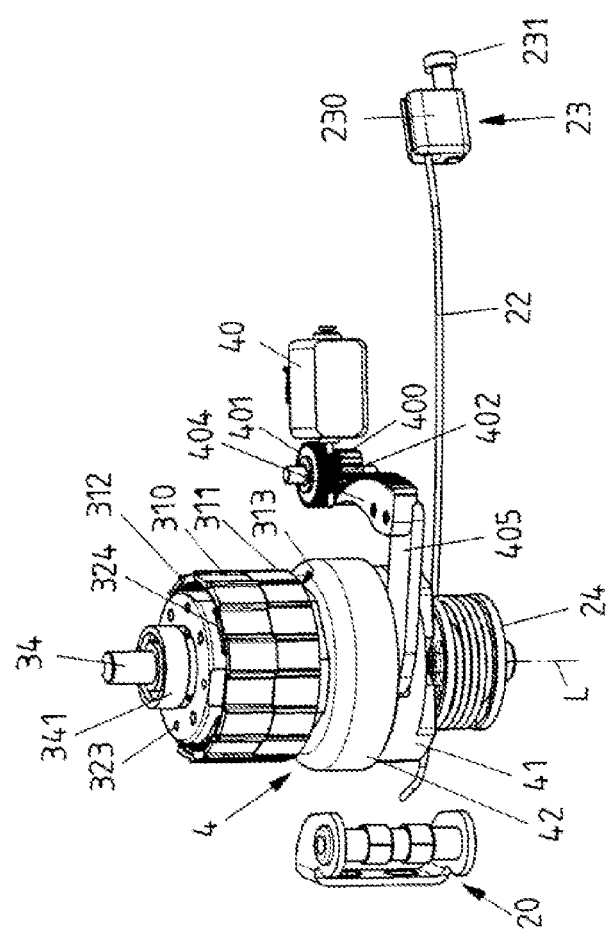
FIG. 10A shows a view of the drive device, with a ring gear of a planetary gear transmission.
Figure 10D:
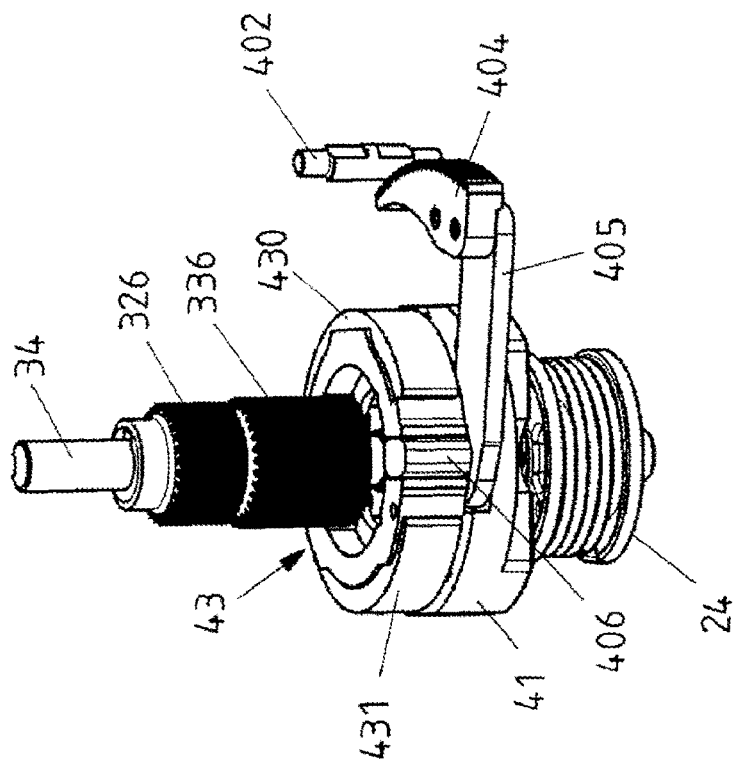
FIG. 10D shows a view of the drive device, illustrating two sun gears of the planetary gear transmission.
Figure 10C:
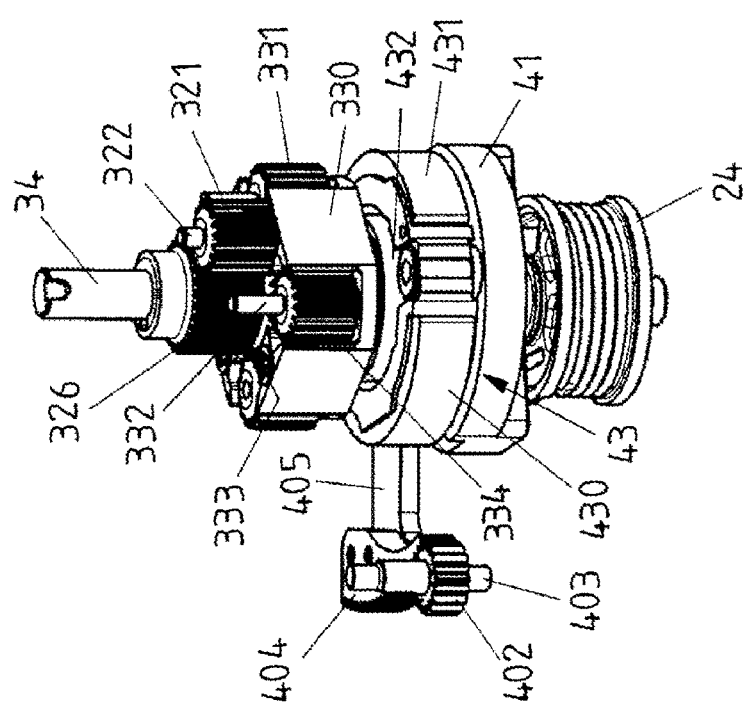
FIG. 10C shows a view of the drive device, illustrating the interaction of the planetary gear stages.
Figure 10E:
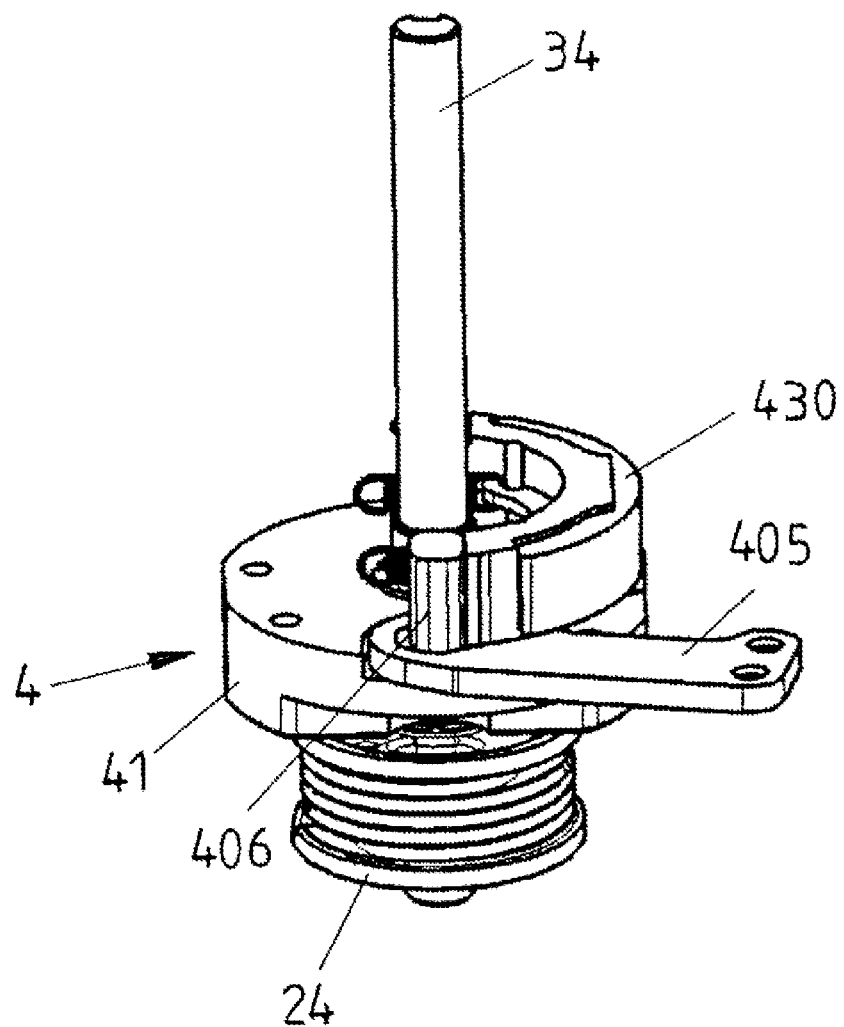
FIG. 10E shows a view of the drive device, with a switching device for switching the planetary gear transmission between different states.

As is apparent from FIG. 8, the cable drum 24 is enclosed in a cable drum housing 380 which is fixedly connected to a housing 38 of the device 2 (see FIGS. 2A and 2B). The cable drum housing 380 supports the cable drum 24 rotatably and serves in addition for the defined guiding of the cable drum 24 relative to the adjustment part 21.

For this purpose, the cable drum housing 380 has limb elements 381 which engage around the adjustment part 21 on both sides and each have a guide element in the form of a guide pin 382 which is in guiding engagement with an associated guide track 214 in the form of a groove on a side 24 of the adjustment part 21 that faces away from the cable drum 24.

When the cable drum 24 rotates, the cable drum 24 therefore runs with its running rings 242, 243 along the running surface 215 of the adjustment part 21. The cable drum 24 is guided here on the adjustment part 21 via the guide pins 382, and therefore, firstly, the cable drum 24 cannot be removed from the running surface 115 and, secondly, the cable drum 24 is guided on the adjustment part 21 in a positionally fixed manner along the longitudinal axis L.

In the exemplary embodiment illustrated, the maximum adjustment distance of the cable drum 24 relative to the adjustment part 21 in the opening direction O (see FIG. 1) is defined via end stops 25. The limb elements 381 of the cable drum housing 380 strike against said end stops 25 (see FIG. 8) when the vehicle door 11 is maximally opened.

The device 2 can be configured and used differently in the manner of a construction kit.

It is thus conceivable and possible to use the device 2 together with a drive device 3, as is realized in the exemplary embodiment according to FIGS. 2A and 2B. In this case, the vehicle door 11 can be moved electromotively relative to the vehicle body 10, wherein manual pivoting of the vehicle door is also possible, and the drive device 3 serves at the same time as a securing device in order to secure the vehicle door 11 in a pivoted position which has been taken up.

Alternatively, the device 2 can also be used without an electromotive drive device 3 without the basic design of the assembly, illustrated in FIGS. 3 to 8, of the device 2 with the adjustment part 21, the traction cable 22 arranged thereon and the cable drum 24 changing as a result. In this case, the device 2 serves as a securing device, wherein a separate braking device can be provided which secures a pivoted position taken up by the vehicle door 11, by braking a movement of the cable drum 24 relative to the traction cable 22.

In the case of the exemplary embodiment according to FIGS. 2A and 2B, the cable drum 24 is coupled to a drive device 3 which has a transmission 30 and is configured in such a manner that the vehicle door 1 can be adjusted electromotively by means of the drive device 3 or manually independently of the drive device 3 or else in a manner assisted electromotively by the drive device 3 in the manner of a servomotor.

The transmission 30 of the drive device 3, illustrated, for example, in FIGS. 9 and 10A-10E, is designed as a two stage planetary gear transmission and has a ring gear 31, two planetary gear stages 32, 33, a central shaft 34 and a spur gear 36 driving the ring gear 31. A cable drum 24 is arranged on the shaft 34 and is connected to the shaft 34 for rotation therewith.

The transmission 30 serves for transmitting a rotational movement, which is introduced into the spur gear 36 via a motor shaft 37, to the cable drum 24 in a (greatly) stepped-down manner. For this purpose, the motor shaft 37 is connected to an electric motor 370 (see FIG. 9) and is driven via the electric motor 370 in order to set the spur gear 36 into a rotational movement.

The spur gear 36 is in engagement via a toothing 360 with an external toothing 314 on a base part 315 of the ring gear 31. By driving of the spur gear 36, the ring gear 31 is set into a rotational movement about an axis of rotation corresponding to the longitudinal axis L of the shaft 34.

The ring gear 31 consists of the base part 315 and a ring gear housing 316 which encloses a first ring gear part 310 and a second ring gear part 311. The base part 315 and the ring gear parts 310, 311 are fixedly connected to each other here via the ring gear housing 316.

The ring gear 31 accommodates the planetary gear stages 32, 33 within itself. Each planetary gear stage 32, 33 here has a plurality of planetary gears 321, 331 which are arranged on one carrier element 320, 330 each, in a manner rotatable about associated axes of rotation 322, 332.

The carrier elements 320, 330 of the two planetary gear stages 32, 33 are connected to each other for conjoint rotation by the axes of rotation 322 of the planetary gears 321 of the first planetary gear stage 32 engaging in associated engagement openings 333 on the carrier element 330 of the second planetary gear stage 33 and, correspondingly conversely, the axes of rotation 332 of the planetary gears 331 of the second planetary gear stage 33 engaging in associated engagement openings 323 on the carrier element 320 of the first planetary gear stage 32.

The planetary gears 321 of the first planetary gear stage 32 are in engagement via their toothing with an internal toothing 312 of the first ring gear part 310 in a meshing manner. In addition, the planetary gears 321 are in engagement with a sun gear 326 of the first planetary gear stage 32. The sun gear 326 is arranged on the shaft 34 for rotation therewith.

The planetary gears 331 of the second planetary gear stage 33 are in engagement with an internal toothing 313 of the second ring gear part 311 in a meshing manner. In addition, the planetary gears 331 are in engagement with a sun gear 336 of the second planetary gear stage 33.

The sun gear 326 of the first planetary gear stage 32 and the sun gear 336 of the second planetary gear stage 33 (see FIG. 10D) are not connected directly to each other. On the contrary, the first sun gear 326 of the first planetary gear stage 32 is arranged on the shaft 34 for rotation therewith, while the second sun gear 336 of the second planetary gear stage 33 is connected for conjoint rotation to a brake pot 42 of a switching device 4, the operation of which will be further explained below.

The ring gear 31 is mounted relative to the shaft 34 via a bearing 341 and, during operation of the transmission 30, rotates relative to the shaft 34. The step-down of the transmission 30 acts here between the ring gear 31 and the shaft 34, and therefore, during operation, the greatest difference in rotational speed occurs between the ring gear 31 and the shaft 34.

The transmission 30 provides a step-down transmission. The step-down is set here by the internal toothing 312 of the first ring gear part 310, the internal toothing 313 of the second ring gear part 311, the planetary gears 321 of the first planetary gear stage 32, the planetary gears 331 of the second planetary gear stage 33 and the sun gears 326, 336 at least partially having a different number of teeth and/or a different modulus. This results in there being at least partially different pitch circle diameters, thus resulting in a step-down of the rotational movement of the ring gear 31 in relation to the cable drum 24.

The modulus of a toothing is understood as meaning a dimension for the size of the teeth of gearwheels. The modulus is defined here as the quotient of gearwheel pitch and pi number $\pi$. The pitch circle diameter of a gearwheel is defined here by the number of teeth multiplied by the modulus of the toothing.

The transmission 30 is switched via a switching device 4 which is illustrated in different views in FIGS. 10A to 10E and 11A to 11C.

The switching device 4 has a brake pot 42 which is fixedly connected to the second sun gear 336 of the transmission 3 and, during rotation of the second sun gear 336, is moved together with said second sun gear 336. Switching elements 43 in the form of brake shoes 430, 431 are arranged on a carrier 41 which is arranged in a fixed position with respect to the housing 38. The brake shoes 430, 431 are arranged on the carrier 41 so as to be pivotable about a pivot axis 432 (see, for example, FIG. 11A) and can be adjusted for switching the transmission 30 between different positions.

For the adjusting of the switching elements 43 in the form of the brake shoes 430, 431, an adjusting element 406 is provided which is arranged pivotably on the carrier 41 and is connected to a lever 405 and can be adjusted via a pinion transmission having pinions 401, 402 which are connected to each other via a shaft 403. A first pinion 401 is in engagement here with a drive worm 400 of an actuator 40, while a second pinion 402 meshes with an adjusting element 404 in the form of a toothed arch which is fixedly connected to the lever 405. The adjusting element 404 and, via the latter, the adjusting element 406, which acts on the brake shoes 430, 431, can be adjusted in a manner driven by the actuator 40, and therefore the brake shoes 430, 431 within the brake pot 42 can be adjusted.

The transmission 30 can be switched between a coupling state, a braking state and a freewheeling state via the switching device 4.

In the coupling state (FIG. 11A), the brake pot 42 is blocked relative to the housing 38 by blocking action of the brake shoes 430, 431 and is therefore held in place relative to the housing 38. In said coupling state, a force flux is produced between the spur gear 36 and the cable drum 24, and therefore the drive motor 370 is coupled to the cable drum 24 via the transmission 30 and the cable drum 24 can be adjusted electromotively.

Figure 11B:
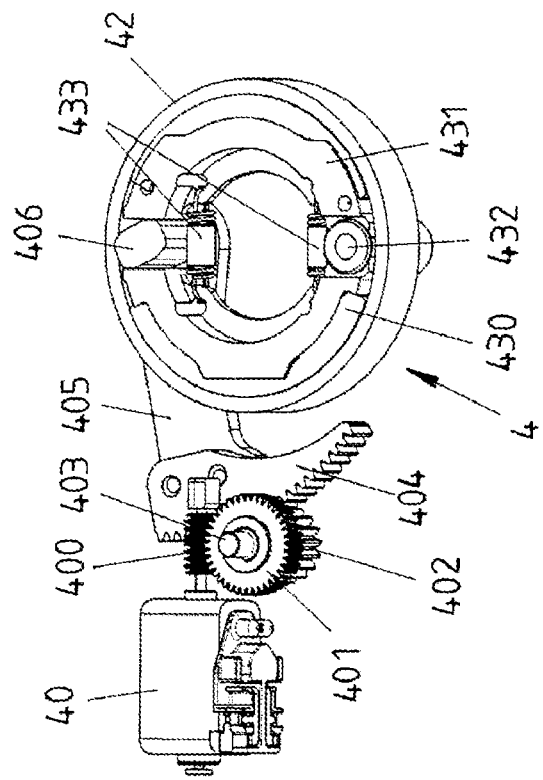
FIG. 11B shows a view of the switching device, in a braking state.
Figure 11A:
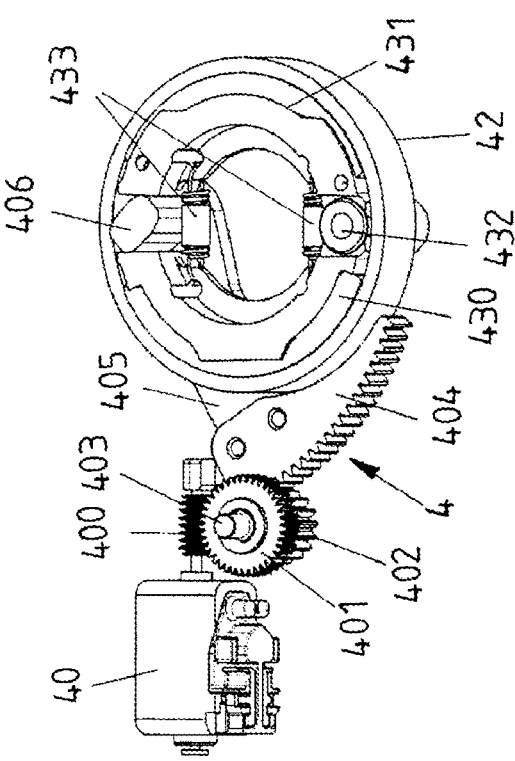
FIG. 11A shows a view of the switching device, in a coupling state.

In the coupling state, the brake shoes 430, 431 are in the coupling position according to FIG. 11A and, for this purpose, are pressed by means of the adjusting element 406 via the actuator 40 on the inside into contact with the brake pot 42 with a maximum force. By means of said blocking contact, the second sun gear 336 of the second planetary gear stage 33 is held in place relative to the carrier 41 and therefore to the housing 38, and therefore the force transmission train between the drive motor 370 and the cable drum 24 is closed and adjustment forces can be transmitted from the drive motor 370 to the cable drum 24, or the cable drum 24 (when the drive motor 370 is not energized) is secured in its position which it has just taken up on account of the self-locking of the transmission 30.

The maximum force with which the brake shoes 430, 431 are pressed into contact with the brake pot 42 can be dimensioned here in such a manner that, when said maximum force is exceeded, the clutch can slip freely. It is thereby possible, for example in emergency situations, for example in the event of jamming, to prevent excessively large adjustment forces from being able to be transmitted.

By contrast, in the braking state (FIG. 11B), the brake shoes 430, 431 are pressed on the inside against the brake pot 42 with a force which is reduced in comparison to the coupling state, and therefore the second sun gear 336 is not blocked, but rather is (merely) braked in a defined manner. The second sun gear 336 can therefore rotate relative to the carrier 41, but is braked in the process via the rubbing contact of the brake shoes 430, 431 against the brake pot 42.

By means of such a braking action, braking of the movement of the vehicle parts 10, 11 with respect to each other can be brought about, for example if, upon manual adjustment, the vehicle door 11 approaches an end position, for example the position open to a maximum. Via a defined braking, too rapid a movement, for example during manual slamming of the vehicle door 11, can also be braked.

In the freewheeling state (FIG. 11C), the brake shoes 430, 431 are in a freewheeling position and are correspondingly removed from the brake pot 42, and therefore the brake pot 42 is not (is no longer) secured in relation to the housing 38 and also no (significant) braking action is brought about by the brake shoes 430, 431. In said freewheeling state, the cable drum 24 can in principle be moved independently of the drive motor 370 without the drive motor 370 also being moved during an output-side movement of the cable drum 24. In said freewheeling state, in particular smooth-running, manual adjustment of the vehicle door 11 independently of the drive motor 370 is possible.

Figure 11C:
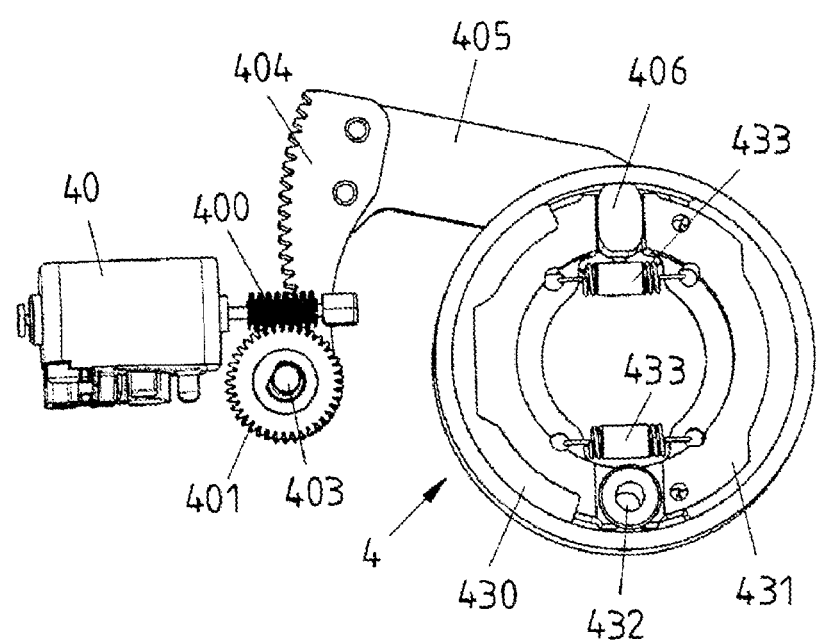
FIG. 11C shows a view of the switching device, in a freewheeling state.

As is apparent from FIGS. 11A to 11C, the brake shoes 430, 431 are prestressed in the direction of their freewheeling position (FIG. 11C) via prestressing elements 433 in the form of tension springs. In order to adjust the brake shoes 430, 431 out of the freewheeling position, the adjusting element 406 pushes the brake shoes 430, 431 apart and therefore in the direction of the brake pot 42. This takes place counter to the action of the prestressing elements 433. In order to reset the brake shoes 430, 431 in the direction of the freewheeling position, the adjusting element 406 is pivoted back, with the brake shoes 430, 431 following the adjusting element 406 because of the action of the prestressing elements 433 and therefore moving back in the direction of their freewheeling position.

In the freewheeling position, the clutch is therefore open. Accordingly, the force transmission train between the drive motor 370 and the cable drum 24 is interrupted.

If an electromotive driving force is intended to be transmitted to the cable drum 24, the switching device 4 locks the brake pot 42 (coupling state) such that the latter is held in place relative to the housing 38. By driving of the spur gear 36, the second planetary gear stage 33 is driven via the second ring gear part 311 by the planetary gears 331 rolling on the sun gear 336 (held in place via the securing element 35). Since the carrier element 330 of the second planetary gear stage 33 is connected to the carrier element 320 of the first planetary gear stage 32 for rotation therewith, the carrier element 320 of the first planetary gear stage 32 is thereby also carried along and therefore the first planetary gear stage 32 is driven. By this means, the planetary gears 321 of the first planetary gear stage 32 roll on the first ring gear part 310 and thereby set the first sun gear 326 into a (slow) rotational movement relative to the second sun gear 336, and therefore, via the first sun gear 326, the shaft 34, which is connected to the first sun gear 326 for rotation therewith, and, via the shaft, the cable drum 24 are set into a rotational movement.

While the ring gear 31 is set into a comparatively rapid rotational movement via the spur gear 36, said rotational movement is transmitted in a stepped-down manner to the cable drum 24 which carries out a comparatively slow rotational movement in comparison to the ring gear 31. The cable drum 24 will therefore be moved relative to the traction cable 22 in order thereby to bring about an adjustment of the vehicle door 11 relative to the vehicle body 10.

The transmission 30 is self-locking on account of its large step-down. This has the effect that, in the coupling state, when the drive motor 370 is not energized, the vehicle door 11 is secured and an external action of force on the vehicle door 11 in particular cannot lead to an undesired adjustment of the vehicle door.

In order to permit manual adjustment of the vehicle door 11, the blocking of the brake pot 42 can be removed by unblocking the switching device 4, and therefore the second sun gear 336 which is fixedly connected to the brake pot 42 is not (no longer) held in place. In this case, the force flux between the cable drum 24 and the spur gear 36 is interrupted, and therefore the cable drum 24 can basically be moved without co-rotation of the spur gear 36 (due to friction effects co-rotation may nevertheless occur, if the spur gear 36 is not held in place by the drive motor 370, but a significant transmission of force cannot occur). By release of the braking direction, it is therefore possible to cancel the securing of the vehicle door 11, and therefore the vehicle door 11 can be pivoted manually.

In order, during a manual adjustment, for example, to achieve braking of the vehicle door 11 before an end position is reached, a switch can be made into the braking state in which the cable drum 24 is acted upon in a braking manner and therefore the adjustment movement of the vehicle door 11 is braked. A switch can also be made into said braking state if, during manual adjustment, stopping of the vehicle door 11 is established, in order to bring about securing of the vehicle door 11 (in a manner easily releasable manually for a user) by means of the braking state. For this purpose, the braking force in the braking state can be dimensioned in such a manner that automatic movement of the door is suppressed when the vehicle is positioned on a slope or in the event of (moderate) wind force.

The driving device 3 can also electromotively assist a manual adjustment of the vehicle door 11. For this purpose, the switching device 4 can be switched, for example, into the braking state in order, with a slipping clutch, to combine a manual adjustment movement with an electromotive driving force.

In this manner, for example, an adjustment movement can be evened out, and therefore a user has to apply a constant manual force, for example over the entire adjustment path of the vehicle door 11, for adjustment purposes. Changes in force along the adjustment path are compensated for in this case via the drive device 3.

Such a compensation can also take place, for example, depending on the position of the vehicle, and therefore, for example when the vehicle is positioned on a slope, for example on an inclination, the vehicle door 11 can nevertheless be closed with comparatively little force.

The drive device 3 can be switched here into a servomode if a suitable sensor device identifies that the vehicle door 11 is being adjusted with a force greater than a predetermined actuating force.

In addition, it is also conceivable and possible to provide defined running on of the vehicle door 11 by means of the drive device 3 during manual adjustment of the door, even if a manual actuating force is no longer present. During a rapid movement of the door (with high dynamics), it is possible, for example, to provide longer running on here while, during a slow rotational movement, only short running on takes place over a short distance.

The actuator 40 is preferably currentless after a switching operation, i.e. after adjustment of the switching elements 43, and therefore the vehicle battery is not excessively loaded by the actuator 40. In order to hold the switching device 4 in its position just set here, the engagement of the drive worm 400 with the pinion 401 is, for example, self-locking.

Figure 12:
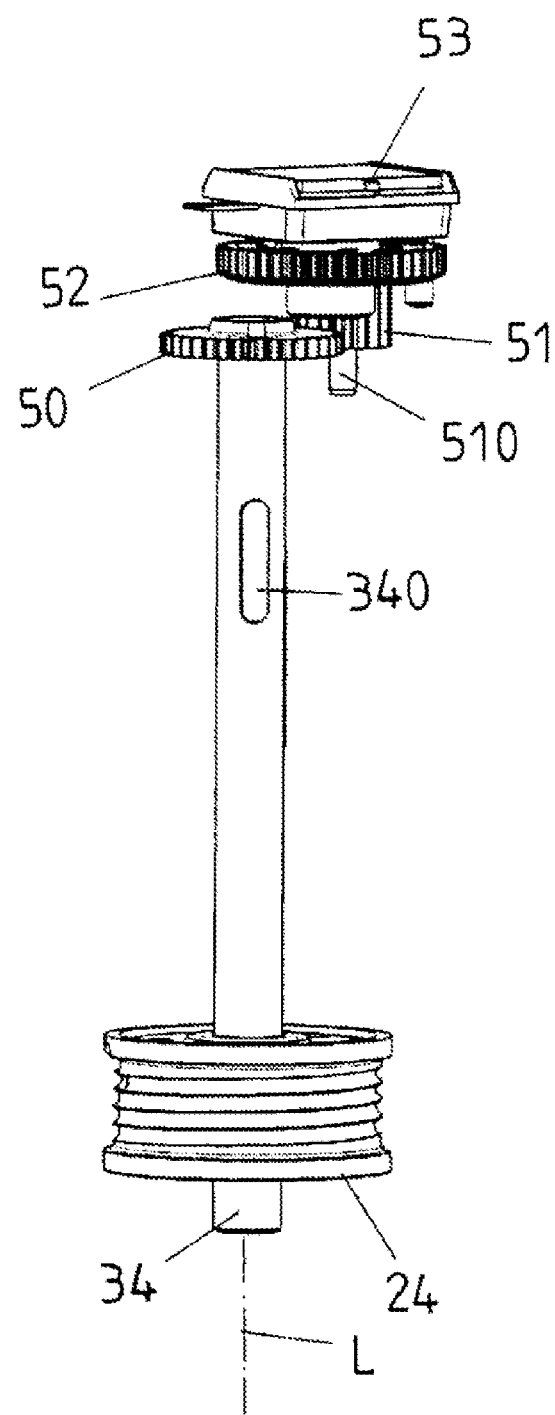
FIG. 12 shows a view of a sensor assembly for measuring the angular position of the cable drum.

In order to determine the absolute position of the vehicle door 11 relative to the vehicle body 10 during adjustment of the vehicle door 11, a sensor device 5 is provided on the drive device 3, the sensor device being designed for measuring the absolute angle between the vehicle door 11 and the vehicle body 10. The sensor device 5, illustrated in FIG. 12 and also apparent, for example, from FIG. 9, has a spur gear 50 which is arranged on the shaft 34 for rotation therewith and is in engagement in a meshing manner with a pinion 51 arranged on a shaft 510. The pinion 51 drives a gearwheel 52 which can have a suitable magnet arrangement or else a visual scale division or the like such that the absolute angular position of the gearwheel 52 and, via the latter, of the shaft 34 with the cable drum 24 arranged thereon can be sensed by means of a sensor 53 located opposite the gearwheel 52.

Owing to the fact that the shaft 34 is connected to the cable drum 24 for rotation therewith, it is possible, via the shaft 34, for the absolute angular position and, via the temporal change in the angle, also for the angular speed of the cable drum 24 to be sensed by a sensor. Via the transmission, which is provided by the spur gear 50, the pinion 51 and the gearwheel 52 and which is preferably a step-down transmission, it can be provided, for example, that the gearwheel 52 is not moved over an angular range of greater than 360° over the entire adjustment path of the cable drum 24 relative to the adjustment part 21, and therefore the absolute position and the speed of the shaft 34 can be detected unambiguously.

Depending on the configuration of the gearwheel 52, the sensor 3 is provided, for example, in the form of a magnetic sensor or in the form of an optical sensor, and is capable of determining the absolute angular position of the gearwheel 52.

However, it is also conceivable and possible to configure the sensor 53, for example, as a Hall effect sensor for determining the relative position of the gearwheel 52. In this case, the sensor 53 detects pulses during rotation of the gearwheel 52 (wherein, in this case, the gearwheel 52 can execute a multiplicity of revolutions over the adjustment path of the adjustment part 21) and, by counting the pulses, can determine the position and the speed of the cable drum 24.

LIST OF REFERENCE SIGNS

1 Vehicle
10 Body
11 Vehicle door
110 Door interior space
111 Door hinge
2 Device
20 Joint
200 Axis of articulation
201 Fastening part
21 Adjustment part (rebound strap)
210, 211 End
212 Fastening device
213 Opening
214 Guide track
215 Running surface
22 Flexible force transmission element (traction cable)
22A, 22B Cable portion
220, 221 End
222, 223 Cable nipple
23 Setting device
230 Slide
231 Clamping element
232 Nipple chamber
24 Cable drum
240 Opening
241 Cable groove
242, 243 Running ring
244, 245 Fastening device (nipple chamber)
25 End stops
3 Drive device
30 Transmission
31 Ring gear
310, 311 Ring gear part
312, 313 Internal toothing
314 External toothing (spur gear)
315 Base part
316 Ring gear housing
32, 33 Planetary gear stage
320, 330 Carrier element
321, 331 Planetary gears
322, 332 Axis of rotation
323, 333 Engagement opening
324, 334 Gear chamber
326, 336 Sun gear
34 Shaft
340 Positive locking element 341 Bearing
36 Spur gear
360 Toothing
37 Motor shaft
370 Drive motor
38 Housing
380 Cable drum housing
381 Limb elements
382 Guide element (guide pin)
4 Switching device
40 Actuator
400 Drive worm
401, 402 Pinions
403 Shaft
404 Adjusting element
405 Lever
406 Adjusting element
41 Carrier
42 Brake pot
43 Switching elements
430, 430 Brake shoe
432 Pivot axis
433 Clamping springs
5 Sensor device (angle measuring device)
50 Spur gear
51 Pinion
510 Shaft
52 Gearwheel
53 Sensor
A Offset
L Longitudinal axis
O Opening direction
V Adjustment device

The invention claimed is:

1. A device for manually or electromotively adjusting or securing a first vehicle part and a second vehicle part relative to each other, the device comprising:
   an adjustment part which has a joint for pivotable arrangement on the first vehicle part, wherein the adjustment part is to be arranged on the first vehicle part in such a manner that, when the vehicle parts are adjusted relative to each other, the adjustment part moves relative to the second vehicle part;
   a traction cable which is fastened at a first end and at a second end to the adjustment part;
   a cable drum which is to be arranged on the second adjustment part, is rotatable about a longitudinal axis, and on which the traction cable is arranged in such a manner that, when the second vehicle part is adjusted relative to the first vehicle part, the traction cable is wound up with one portion onto the cable drum and is unwound with another portion from the cable drum, wherein the cable drum is accommodated in a cable drum housing arranged on the second vehicle part and the cable drum housing is guided on the adjustment part; and
   an electromotive drive device for driving the cable drum.

2. The device as claimed in claim 1, wherein the cable drum has at least one fastening device for positive locking fastening of the traction cable to the cable drum.

3. The device as claimed in claim 1, wherein the cable drum has a first fastening device, into which a first portion of the traction cable can be placed in a positive locking manner, and a second fastening device, into which a second portion of the traction cable can be placed in a positive locking manner.

4. The device as claimed in claim 3, wherein the first portion and the second portion are formed by cable portions which are separate from each other.

5. The device as claimed in claim 1, wherein the cable drum housing engages around the adjustment part with at least one limb element and has a guide element which is guided on a side of the adjustment part that faces away from the cable drum.

6. The device as claimed in claim 5, wherein, on the side facing away from the cable drum, the adjustment part has at least one guide track in which the at least one guide element of the cable drum housing is guided.

7. The device as claimed in claim 1, wherein the traction cable is fixed at its first end and at its second end on the adjustment part in a non-positive locking or in a positive locking manner.

8. The device as claimed in claim 7, wherein the adjustment part has two fastening devices for fastening the ends of the traction cable to the adjustment part, wherein the fastening devices are offset with respect to each other along the longitudinal axis about which the cable drum is rotatable.

9. The device as claimed in claim 1, wherein a setting device is arranged on the adjustment part, on which setting device the first end or the second end of a force transmission element is arranged and which is adjustable for setting the length of the traction cable extending freely on the adjustment part between the first end and the second end.

10. The device as claimed in claim 1, wherein the drive device has a drive motor and a transmission coupling the drive motor to the cable drum.

11. The device as claimed in claim 10, wherein the transmission is switchable between:
    a coupling state in which the drive motor is coupled to the cable drum,
    a freewheeling state in which the coupling between the drive motor and the cable drum is interrupted in such a manner that the cable drum is movable independently of the drive motor, and
    a braking state in which the cable drum is movable independently of the drive motor, but is braked in the process.

12. The device as claimed in claim 10, wherein the transmission is designed as a planetary gear transmission comprising:
    a housing section,
    a first planetary gear stage which has a first carrier element and at least one first planetary gear arranged on the first carrier element,
    a second planetary gear stage which has a second carrier element and at least one second planetary gear arranged on the second carrier element,
    a first ring gear part which is in toothing engagement with the at least one first planetary gear,
    a second ring gear part which is in toothing engagement with the at least one second planetary gear, and
    a drivable drive element,
    wherein an adjustment force can be transmitted to the cable drum via the first planetary gear stage and the second planetary gear stage by driving of the drive element.

13. The device as claimed in claim 12, wherein the first ring gear part and the second ring gear part are connected to each other for conjoint rotation.

14. The device as claimed in claim 12, wherein the first planetary gear stage has a first sun gear which is in engagement with the at least one first planetary gear, and the second planetary gear stage has a second sun gear which is in engagement with the at least one second planetary gear and is different from the first sun gear, wherein, for transmitting an adjustment force from the drive element to the cable drum, one of the sun gears can be secured relative to the housing section and the other of the sun gears is connected to the cable drum for transmitting the adjustment force.

15. The device as claimed in claim 14, wherein the first carrier element and the second carrier element are connected to each other for conjoint rotation.

16. The device as claimed in claim 14, wherein at least one of the first sun gear, the second sun gear and the cable drum are arranged on a common shaft which is rotatable about a longitudinal axis relative to the housing section, the first sun gear and the cable drum are connected to the shaft for rotation therewith, and the second sun gear is arranged rotatably on the shaft.

17. The device as claimed in claim 14, wherein the transmission has a switching device which has a brake pot connected to the second sun gear, and at least one switching element which is adjustable between a coupling position, a braking position and a freewheeling position and is arranged on a carrier.

18. The device as claimed in claim 17, wherein the second sun gear:
  in the coupling position is held in place relative to the carrier by blocking contact of the at least one switching element against the brake pot,
  in the braking position is movable in a braked manner relative to the carrier by braking contact of the at least one switching element against the brake pot, and
  in the freewheeling position is freely movable relative to the carrier.

19. The device as claimed in claim 17, wherein at least one of the switching device has an adjusting element, which is connected to an actuator and is drivable via the actuator, for adjusting the at least one switching element, and the switching device has at least one prestressing element prestressing the at least one switching element in the direction of the freewheeling position.

\* \* \* \* \*